June 4, 1968  S. T. KELLY  3,386,469
PRESSURE REGULATOR
Filed July 29, 1966
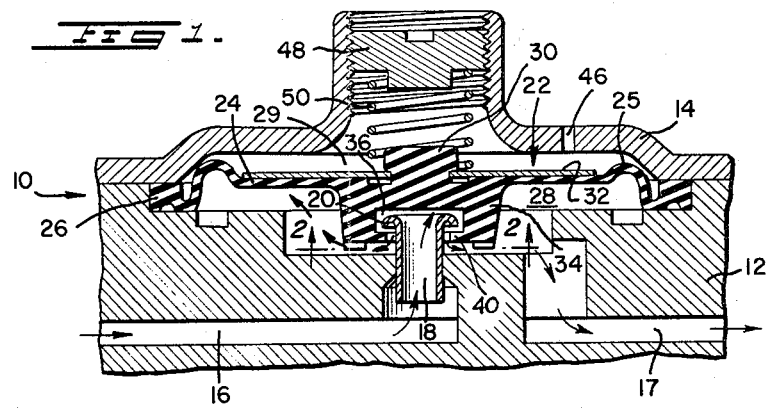
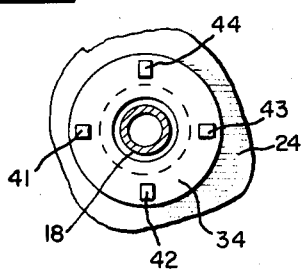
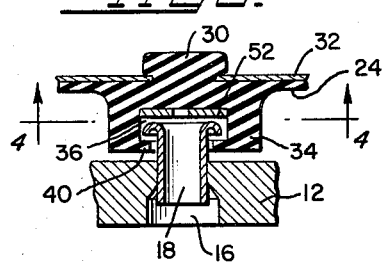
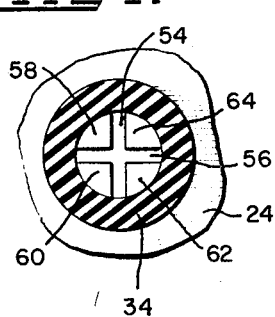
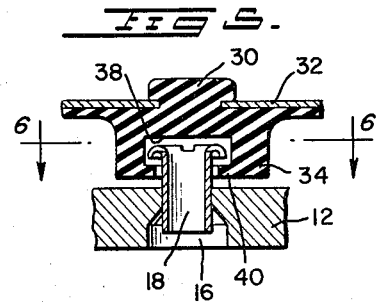
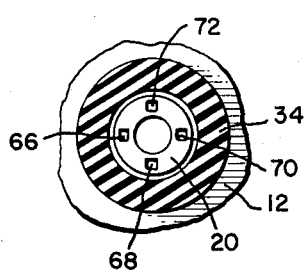
INVENTOR
SAMUEL T. KELLY
BY Anthony A. O'Brien
ATTORNEY

United States Patent Office 3,386,469
Patented June 4, 1968

3,386,469
PRESSURE REGULATOR
Samuel T. Kelly, Torrance, Calif., assignor to Robertshaw Controls Company, Richmond, Va., a corporation of Delaware
Filed July 29, 1966, Ser. No. 568,905
7 Claims. (Cl. 137—505.38)

This invention relates generally to flow control devices and more particularly to pressure responsive regulating devices.

An object of this invention is to construct a pressure regulator employing a unitary valve and diaphragm.

Another object of this invention is to increase the effective range of a pressure regulator by preventing the diaphragm from closing upon its valve seat under minimum flow conditions.

Another object is to form a valve face as a boundary wall of the cavity within the diaphragm so that the valve face cooperates with a valve seat positioned in the cavity to regulate the fluid flow.

It is another object of this invention to provide a pressure regulator that is economical to manufacture and assemble from a minimum number of parts.

In practicing the present invention, a pressure regulator includes a valve housing with inlet and outlet passages for permitting a fluid to pass therethrough, a diaphragm valve for regulating such fluid flow being operatively disposed between the inlet and outlet passages to divide the housing into an upper and lower chamber, a central segment of the diaphragm extending into the lower chamber, a downwardly open cavity in the bottom of the segment communicating with the inlet passage, a horizontally extending face defining the upper end of the cavity, a valve seat positioned beneath the face, an adjustable spring in the upper chamber urging the face into engagement with the valve seat, and means in the lower chamber permitting minimum communication between the inlet and outlet passages under all conditions of fluid flow. Such means may be lugs on the bottom surface of the central segment of the diaphragm, raised lands on the horizontal face of the cavity, raised surfaces on the valve seat, or combinations of these structures.

Other objects and advantages of this invention will become apparent from the following description when taken in connection with the accompanying drawings wherein:

FIG. 1 is a vertical cross-section of a pressure regulator constructed in accordance with the principles of this invention with portions of the regulator housing being omitted;

FIG. 2 is a horizontal cross-section along the bottom of the diaphragm valve, taken along line 2—2 in FIG. 1 and in the direction indicated;

FIG. 3 is a fragmentary vertical cross-section of an alternative diaphragm and valve seat construction;

FIG. 4 is a horizontal cross-section of the central segment of the diaphragm taken along line 4—4 in FIG. 3 and in the direction indicated;

FIG. 5 is a fragmentary vertical cross-section of a second alternative diaphragm and valve seat construction; and FIG. 6 is a horizontal cross-section through the central portion of the diaphragm taken along line 6—6 in FIG. 5 and in the direction indicated.

Referring now to the drawings, FIG. 1 shows a pressure regulator 10 having a metal base portion 12 and a cover section 14. An inlet passage 16 and an outlet passage 17 are formed within base 12. Inlet passage 16 permits the flow of the fluid from a source (not shown) through a hollow metal tubular rivet or eyelet 18 into contact with a regulating diaphragm and subsequently into passage 17. Rivet 18 is permanently secured to base 12 within an upwardly extending portion of passage 16 so that the upper, everted lip 20 of the rivet serves as a valve seat for the flexible diaphragm, indicated generally by reference numeral 22.

Diaphragm 22 has a portion 24 that terminates in circumferential edge 26. The diaphragm is retained in compression in lower chamber 28 in the regulator housing by the sealing engagement of cover 14 upon base 12 such that an annular flexible ridge 25 is formed. An upper chamber 29 is defined in the regulator between diaphragm 22 and the interior wall of cover 14. An upwardly extending hub 30 is located atop diaphragm 22 and washer pan 32 is pressed over hub 30 into engagement with a reduced diameter portion of the hub. A central depending segment 34 is integrally formed on the underside of diaphragm 22 and extends axially downward to a point below lip 20 of rivet 18.

A downwardly opening cavity 36, with a rectangular cross-section as viewed in FIG. 1, is formed in segment 34 and communicates with inlet passage 16 via rivet 18. Such cavity is defined at its upper end by horizontally extending face 38 and its vertical boundaries are determined by the spacing between the interior walls of segment 34. A horizontally extending annular flange 40 at the lower end of segment 34 partially closes cavity 36 from communication with chamber 28.

The vertical dimension of cavity 36 is selected such as to enable relative axial movement between flange 40 and the lower surface of lip 20 as well as relative movement between face 38 and the upper, seating surface of lip 20. The horizontal dimension of flange 40 is chosen to permit communication between cavity 36 and lower chamber 28 along the external diameter of rivet 18.

A series of lugs 41, 42, 43 and 44 are angularly spaced about the bottom of segment 34, as shown in FIG. 2. These lugs have an axial dimension slightly greater than the distance between face 38 and the upper surface of lip 20, and thereby limit the downward movement of diaphragm 22 by abutting against the horizontal wall adjacent to the bottom of chamber 28. The angular spacing of lugs 41, 42, 43 and 44 enhances the communication between cavity 36 and chamber 28 and outlet passage 17.

Upper chamber 29, which is located at the opposite side of diaphragm 22, communicates with ambient conditions via vent 46 in cover 14. The dome or stack portion of the cover is situated above hub 30 of diaphragm 22, and an adjustable cap 48 and a coil spring 50 are disposed therein to exert a biasing force through washer pan 32 upon the diaphragm. Cap 48 has peripheral screw threads which engage the matching screw threads of the interior of the dome to allow adjustment of the cap and thereby vary the magnitude of the downward force exerted by spring 50.

FIGS. 3 and 4 illustrate an alternate configuration for maintaining regulated flow through regulator 10 under low flow conditions. The other structural components of regulator 10, shown in FIG. 1, are omitted from FIGS. 3 and 4 since the distinguishing features of this embodiment reside within cavity 36.

An insert 52 is positioned within cavity 36 adjacent to face 38 and above lip 20 of rivet 18. Insert 52 conforms in shape to face 38 and has a pair of relatively deep diagonal grooves 54, 56 formed in its lower surface. These grooves intersect each other, and form four, pie-shaped lands 58, 60, 62 and 64. Under conditions of minimum flow, the force of spring 50 and the atmospheric pressure in upper chamber 29 may exert sufficient downward pressure to force against the upper rim of lip 20, which lip functions as a valve seat. Lands 58, 60, 62 and 64 have a vertical dimension of sufficient size to permit a minimum flow through grooves 54 and 56. Such flow enters cavity 36 between the horizontatal edge of lip 20 and the interior vertical walls although the lands are in engagement with lip 20.

Insert 52 could be replaced by molding a similar configuration of lands and grooves directly into the surface of face 38 while diaphragm 22 is being fabricated.

FIGS. 5 and 6 depict the distinguishing features of another structural configuration for providing minimum flow although face 38 of cavity 36 may be engaged upon lip 20. Angularly spaced notches 66, 68, 70 and 72 are cut in the upper surface of lip 20 of sufficient depth so that minimum flow is possible under all conditions of operation.

Regulator 10 operates in the following manner to maintain a uniform flow in outlet passage 17 with the direction of flow through the regulator being indicated in FIG. 1. If the pressure in inlet passage 16 momentarily increases, or surges, diaphragm 22 moves upwardly to reduce the space between horizontal face or wall 36 of interior cavity 36 and lip 20 of rivet 18. Such movement restricts the variable circumferential passageway formed therebetween within cavity 36 and reduces the outlet pressure in passage 17 to the pressure setting determined by adjustment of cap 48. The regulated flow exits through the circumferential passageway and passes alongside rivet 18 into lower chamber 28, and then into passage 17. The pressure within chamber 28 tends to counterbalance the downward forces exerted upon diaphragm 22 by spring 50 and the atmospheric pressure in upper chamber 29 that enters the regulator through vent 46.

If the pressure in passage 16 decreases, spring 50 forces diaphragm 22 downwardly so that the vertical dimension of the circumferential passageway between lip 20 and wall 32 increases. The pressure emanating from interior cavity 36 is thus increased and the pressure in outlet passage 17 returns to the level determined by the regulator setting. Simultaneously, the flow entering lower chamber 28 attains the same pressure level as the downward pressures exerted by spring 50 and the atmospheric pressure in upper chamber 29 so that diaphragm 22 is maintained in dynamic equilibrium condition, and the flow in passage 17 remains constant at the desired pressure level.

It is noted that terms such as inlet, outlet, upper chamber and lower chamber, are employed merely for ease in describing this invention, and are not intended to be limiting in nature. Manifestly, the above described pressure regulator is susceptible of further modification, such as by combining the use of lugs, inserts and/or notches, without departing from the spirit of this invention. Accordingly, it is intended that the appended claims shall be broadly construed commensurate with the advances in the arts and sciences achieved hereby.

What is claimed is:
1. A pressure regulator comprising:
   a housing having inlet and outlet passage means for permitting fluid flow therethrough,
   a diaphragm valve means for regulating the fluid flow operatively disposed between said inlet and outlet passages to divide said housing into an upper and a lower chamber,
   a central segment depending from said diaphragm valve means into said lower chamber,
   a downwardly opening cavity formed in the bottom of said central section for communicating with said inlet passage means,
   the upper end of said cavity being defined by a horizontally extending wall,
   valve seat means disposed within said cavity below said wall,
   means within said upper chamber for forcing said horizontal means into engagement with said valve seat means to terminate fluid flow, and
   means within said lower chamber to permit minimum flow between said inlet and outlet passage means under low flow conditions.

2. A pressure regulator as defined in claim 1 wherein said means for permitting minimum flow comprises a plurality of spaced lugs on the bottom edge of said central depending segment, said lugs having a vertical dimension greater than the distance between said horizontal wall of said cavity and said valve seat means.

3. A pressure regulator as defined in claim 1 wherein said means for permitting minimum flow comprises an insert positioned adjacent to said horizontal wall and spaced above said valve seat means, said insert having raised lands and depressed grooves therein, said grooves being sufficiently deep to permit minimum flow when said insert engages said valve seat means.

4. A pressure regulator as defined in claim 1 wherein said means for permitting minimum flow comprises raised lands and depressed grooves molded into said horizontal wall of said cavity, said grooves being sufficiently deep to permit minimum flow when said horizontal wall engages said valve seat means.

5. A pressure regulator as defined in claim 1 wherein said valve seat means comprises a tubular rivet positioned in communication with said inlet means, and an everted lip at the upper end of said rivet extends into said cavity.

6. A pressure regulator as defined in claim 5 wherein said means for permitting minimum flow comprises a plurality of spaced notches in the upper surface of said everted lip.

7. A pressure regulator as defined in claim 5 wherein annular flange means are formed on the bottom wall of said central segment, said flange means extending horizontally inwardly to a position intermediate said lip and said rivet, the vertical distance between said flange means and said lip controlling the pressure of fluid flow between said inlet passage means and said outlet passage means.

References Cited

UNITED STATES PATENTS 3,270,575   9/1966   Engler _____ 137—505.38 XR

FOREIGN PATENTS 845,244   5/1939   France.

WILLIAM F. O'DEA, *Primary Examiner.*

H. W. WEAKLEY, *Assistant Examiner.*